United States Patent
DiVencenzo et al.

(10) Patent No.: US 9,993,955 B2
(45) Date of Patent: Jun. 12, 2018

(54) INTERDEPENDENT DRIVE SYSTEM

(71) Applicants: Zachary DiVencenzo, Austintown, OH (US); Jim D'Andrea, Jr., Youngstown, OH (US); Daniel Fernback, Jr., Youngstown, OH (US)

(72) Inventors: Zachary DiVencenzo, Austintown, OH (US); Jim D'Andrea, Jr., Youngstown, OH (US); Daniel Fernback, Jr., Youngstown, OH (US)

(73) Assignee: Juggerbot 3D, LLC, Youngstown, OH (US)

( * ) Notice: Subject to any disclaimer, the term of this patent is extended or adjusted under 35 U.S.C. 154(b) by 260 days.

(21) Appl. No.: 15/048,434

(22) Filed: Feb. 19, 2016

(65) Prior Publication Data
US 2016/0250793 A1    Sep. 1, 2016

Related U.S. Application Data

(60) Provisional application No. 62/121,714, filed on Feb. 27, 2015.

(51) Int. Cl.

| | | |
|---|---|---|
| *B29C 47/08* | (2006.01) | |
| *B29C 47/00* | (2006.01) | |
| *B29C 47/10* | (2006.01) | |
| *B29C 47/92* | (2006.01) | |
| *B33Y 10/00* | (2015.01) | |
| *B33Y 30/00* | (2015.01) | |
| *B29C 64/106* | (2017.01) | |
| *B29K 25/00* | (2006.01) | |
| *B29K 33/04* | (2006.01) | |
| *B29K 29/00* | (2006.01) | |
| *B29L 31/00* | (2006.01) | |

(52) U.S. Cl.
CPC ...... *B29C 47/0813* (2013.01); *B29C 47/0002* (2013.01); *B29C 47/0806* (2013.01); *B29C 47/0866* (2013.01); *B29C 47/1054* (2013.01); *B29C 47/92* (2013.01); *B29C 64/106* (2017.08); *B33Y 10/00* (2014.12); *B33Y 30/00* (2014.12); *B29C 2947/926* (2013.01); *B29C 2947/9258* (2013.01); *B29K 2025/04* (2013.01); *B29K 2029/04* (2013.01); *B29K 2033/04* (2013.01); *B29L 2031/731* (2013.01)

(58) Field of Classification Search
CPC ............ B29C 47/0813; B29C 47/1054; B29C 64/106
See application file for complete search history.

(56) References Cited

U.S. PATENT DOCUMENTS

| | | | |
|---|---|---|---|
| 5,121,329 A | 6/1992 | Crump | |
| 5,340,433 A | 8/1994 | Crump | |
| 5,370,290 A | 12/1994 | Gilliland | |
| 8,403,658 B2 * | 3/2013 | Swanson | ............. B29C 67/0055 264/308 |
| 2007/0228590 A1 * | 10/2007 | LaBossiere | ......... B29C 47/0002 264/40.1 |

* cited by examiner

Primary Examiner — James Sanders
(74) Attorney, Agent, or Firm — Fay Sharpe LLP

(57) ABSTRACT

An interdependent dual driver system for advancing and extruding thermoplastic material to be used in 3-dimensional printing applications. The system and process uses a two-driver system where one driver pushes the material through the device while the second driver pulls the material. The material is advanced through a nozzle designed to heat and extrude thermoplastic materials.

10 Claims, 6 Drawing Sheets

INTERDEPENDENT DRIVE SYSTEM

CROSS REFERENCE TO RELATED PATENTS AND APPLICATIONS

This application claims priority to and the benefit of the filing date of U.S. Provisional Patent Application Ser. No. 62/121,714, filed Feb. 27, 2015, which application is hereby incorporated by reference.

FIELD OF INVENTION

The present disclosure relates to an extrusion system and method, and more specifically to an extrusion system and method for use in additive manufacturing.

BACKGROUND

Material extrusion is a commonly used additive manufacturing technology that involves heating and extruding thermoplastic filament and depositing the extruded material onto a build plate creating a three dimensional model one layer at a time. In these additive manufacturing processes, current methods of extrusion include, but are not limited to, direct drive extrusion and remote drive extrusion. In a direct drive extrusion process, the driving unit is directly connected to the heating component and extrusion nozzle. In an indirect drive extrusion process, the driving unit is mounted remotely and the filament is guided to the heating component and extrusion nozzle via flexible tubing. Feed rate and speed are difficult to optimize in either of these processes due to the need for additional compression of the drive rolls as feed rate and speed increase. Before optimal feed rate and speed can be reached, required drive roll compression can cause damage to the filament.

U.S. Pat. No. 5,121,329 describes an early apparatus and method for creating three-dimensional objects. The '329 patent sets forth basic principles regarding additive manufacturing and drive systems, and is hereby incorporated herein by reference in its entirety.

SUMMARY OF INVENTION

It has been found to be beneficial to utilize two drivers working in unison to feed the filament during the extrusion process—a static filament driver pushing the filament as a dynamic filament driver pulls the filament. This improved drive system and method allows for optimal feed rate and speed without deforming the filament or allowing slippage of the driver and filament, or causing jamming of filament through the path of extrusion. The drive system and method of the present disclosure is especially beneficial in the fact that it enables the use of a broader variety of materials than either a direct drive or indirect drive system alone. The drive system and method of the present disclosure further allows for more optimal control of the thermoplastic filament as the filament is advanced or retracted through the system, mitigating clogging issues seen with direct and indirect extrusion systems.

Additionally, by utilizing multiple drivers to feed the filament to the extrusion nozzle, smaller and/or less powerful components can be used than may otherwise be required. For example, two smaller and/or lesser-torqued motors can be used while maintaining quality feed rates. More efficient operating specifications and/or parameters can be obtained, such as lower extrusion temperatures, due to the fact that the driver motors are not being overworked so that there is no need to compensate with high extrusion temperatures, for example.

In accordance with one aspect of the present disclosure, an extrusion method includes an interdependent dual drive assembly to extrude a thermoplastic filament into layers to form a three-dimensional article or object. The dual drive assembly comprises a static filament driver having a proximal end, a distal end, wherein the proximal and the distal end each include a filament gate, a dynamic filament driver having a proximal end and a distal end, wherein the proximal end is connected to the static drive system through a flexible element and the distal end is attached to a filament extrusion end, and an extrusion nozzle.

In accordance with another aspect, a method for extruding thermoplastic material to be used in additive manufacturing applications is provided. The method includes a material holder that contains a spool of single stranded thermoplastic filament, an interdependent dual drive assembly comprising a static filament driver having a proximal end and a distal end, wherein a filament gate is disposed at the proximal end and a filament exit gate is disposed at the distal end, and a dynamic filament driver having a proximal end and a distal end. In this embodiment, the proximal end is connected to the static drive system through a flexible element and the distal end is attached to a filament extrusion end.

In accordance with yet another aspect, a method for extruding a thermoplastic filament to be used in additive manufacturing applications is provided, the method including placing a spool of single stranded thermoplastic filament into a material holder, loading the thermoplastic filament into a static filament driver through a filament gate, pushing the filament through a filament exit gate, flexible tubing and dynamic filament driver, pulling the filament through the dynamic filament driver, pushing the filament from the dynamic filament driver into a heating component and extrusion nozzle, and extruding the filament which deposits in layers to form a three-dimensional object/article.

DETAILED DESCRIPTION

The interdependent drive assembly in accordance with the present disclosure is designed for additive manufacturing of articles/objects of utility.

Figure 1:
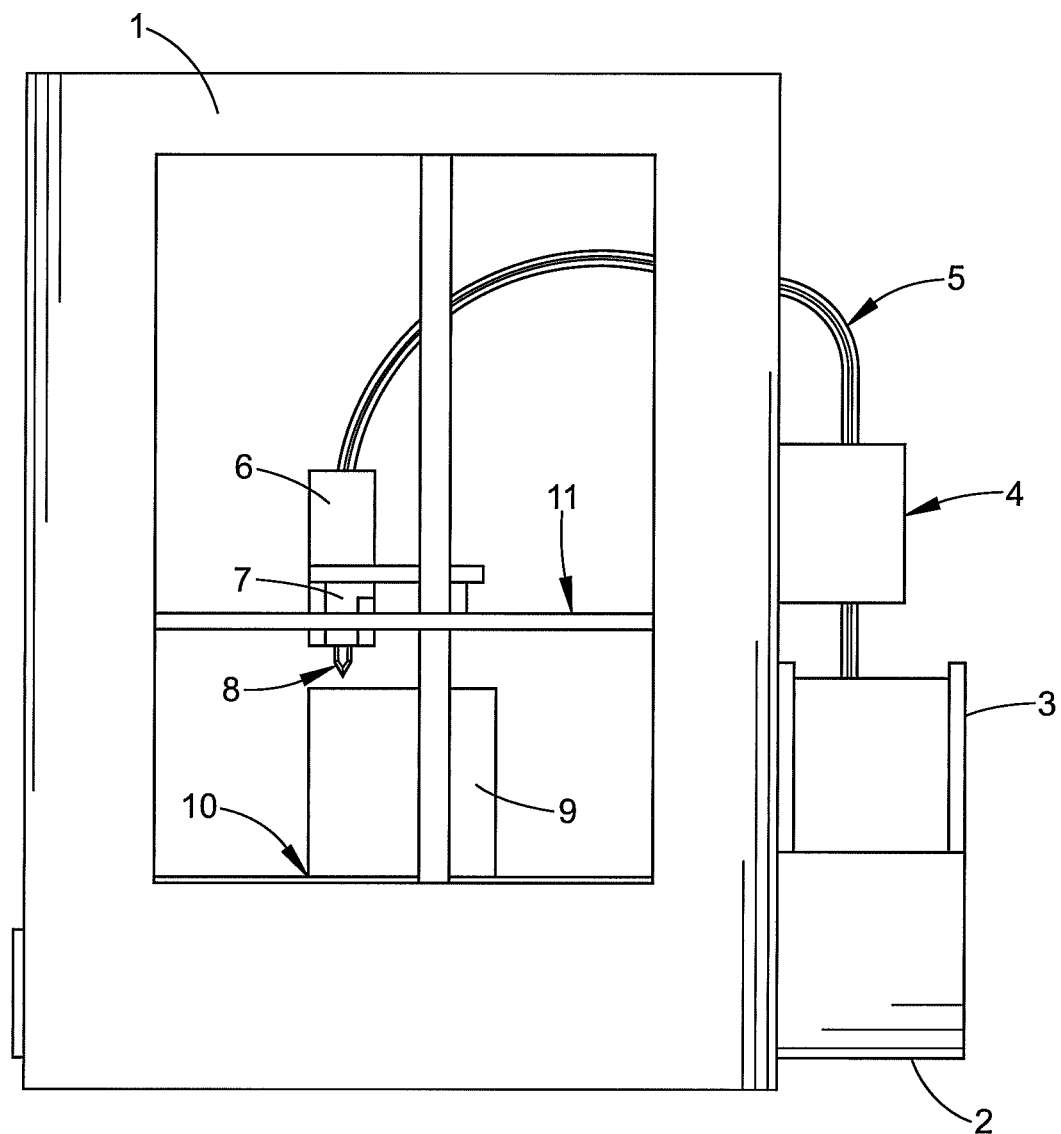
FIG. 1 is a side perspective view of a unit for building 3D objects with an interdependent drive system.
Figure 4:
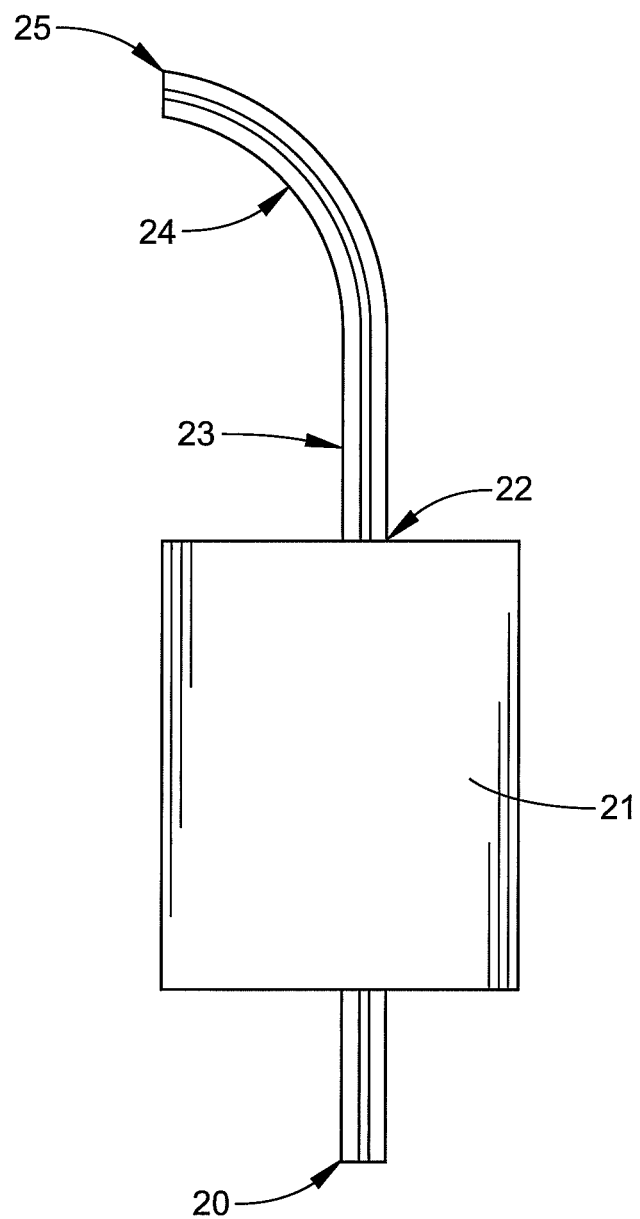
FIG. 4 is a detailed view of the static driver assembly used in the interdependent drive system.

As shown in FIG. 1, an interdependent drive assembly includes a main body 1 having a frame that can be open, partially open (shown as an inset in FIG. 2) or fully enclosed (shown as an inset in FIG. 4). The main body 1 can be made of any known material including but not limited to a metal, stainless steel, heavy duty plastic, glass, ceramic, etc. and may be opaque or transparent. In one embodiment the main body 1 includes on its outer or exterior side a material or filament holder 2 to hold a spool of thermoplastic filament 3, a static filament driver/drive assembly 4, and a flexible tubing 5 connecting the filament holder/mount 2 and static driver 4. The static filament driver 4 can be mounted remotely in an ideal location as shown in FIG. 1, which is tangent to the thermoplastic filament lead being unwound from the thermoplastic filament spool 3. On the interior side of the main body 1 is a dynamic filament driver/drive assembly 6, art known gantry system 11 and a heated build platform 10. The gantry system 11 is built to transport or move the dynamic filament drive assembly 6, a filament extrusion head/hot end 7 and the filament extrusion nozzle 8 in the x, y, and z directions. The heated build platform 10 can be made of any known heat retentive materials including but not limited to polyetherimide or aluminum or glass, and is set to a temperature according to the filament specifications. The flexible tubing 5 can be transparent to aid in the visualization of the filament traversing through it or may be opaque. The flexible tubing 5 could be made of any art known materials including but not limited to polytetrafluoroethylene (PTFE). The tubing 5 can be detachable from both static filament driver 21 and dynamic filament driver 6 drivers via 'push-to-connect' tubing connectors 22, 26 (shown in FIGS. 4 and 5).

The tubing 5 generally helps to guide the filament pushed from the static filament drive assembly 4 to the dynamic filament drive assembly 6. The dynamic filament driver 6 then pulls the filament guided by tubing 5 and feeds it into the filament extrusion hot end 7 which is heated by any known means including but not limited to a standard FFF printer filament extrusion hot end according to filament specifications. Because of the increase in temperature that is sufficient to melt the filament, it turns into a more viscous state in the filament extrusion head/hot end 7, and flows through the filament extrusion nozzle 8. The spool of thermoplastic filament 3 may consist of any thermoplastic utilized in an additive manufacturing system, including but not limited to acrylonitrile butadiene styrene (ABS), polylactic acid (PLA), high-impact polystyrene (HIPS), polyvinyl alcohol (PVA), etc. The spool of thermoplastic filament 3 which can be colored or colorless is positioned on the main body 1 by means of a filament material holder/mount 2.

Figure 2:
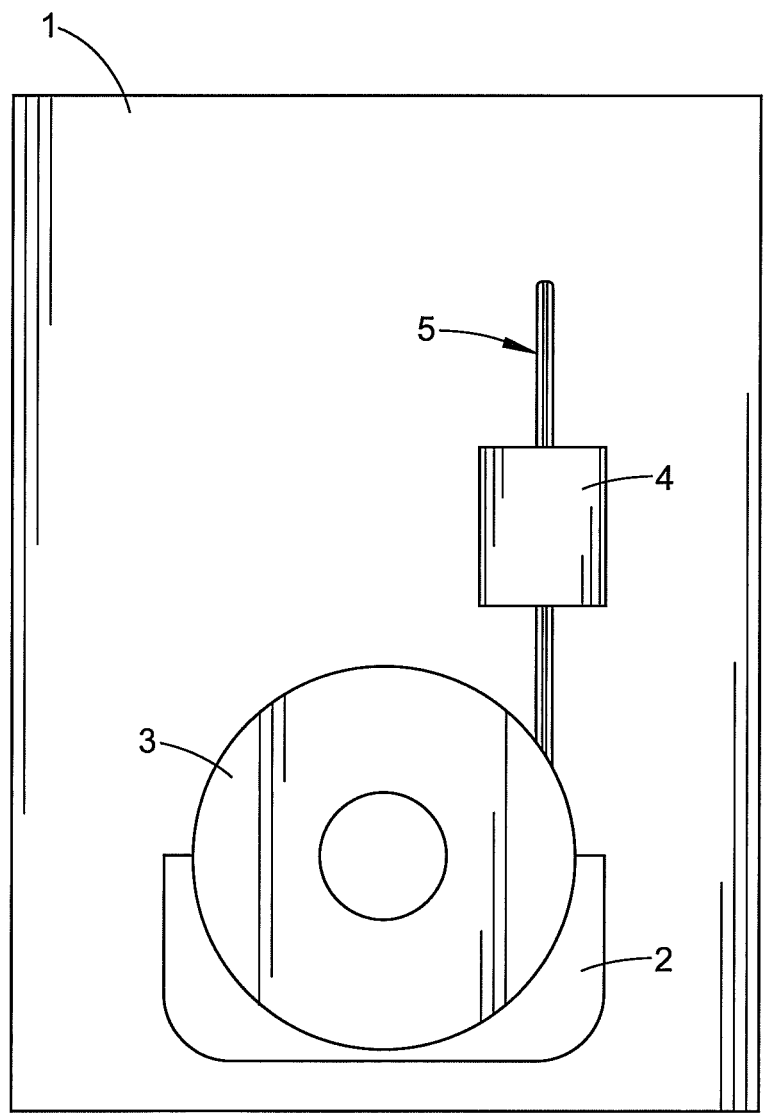
FIG. 2 is a rear perspective view of a unit for building 3D objects with an interdependent drive system.

As shown in FIG. 2 the spool of thermoplastic filament 3 which resides in the filament material spool holder/mount 2 and the static driver assembly 4 can be permanently attached to the main body 1. In this embodiment the thermoplastic filament can be manually fed through a filament entry gate 20 (shown in FIG. 4) of the static filament drive assembly 4 until thermoplastic filament is engaged with the drive rolls (not shown) of the static filament drive assembly 4. The drive rolls that are disposed in the static drive assembly 4 can be controlled by electrical or electromechanical means to engage with a drive motor (not shown) that together makes up the static driver 21 (shown in FIG. 4). Once the thermoplastic filament is engaged with the drive rolls it will then be advanced through the PTFE tubing 5 to pass through an exit gate 23 which can be a product of PTFE tubing 24 connected to static driver 21 by means of a primary push-to-connector 22 (shown in FIG. 4). The thermoplastic filament that is pushed from static driver 21 through subsequent tubing 24 can enter the main body 1 at inlet 25 (shown in FIGS. 4 & 5).

Figure 3:
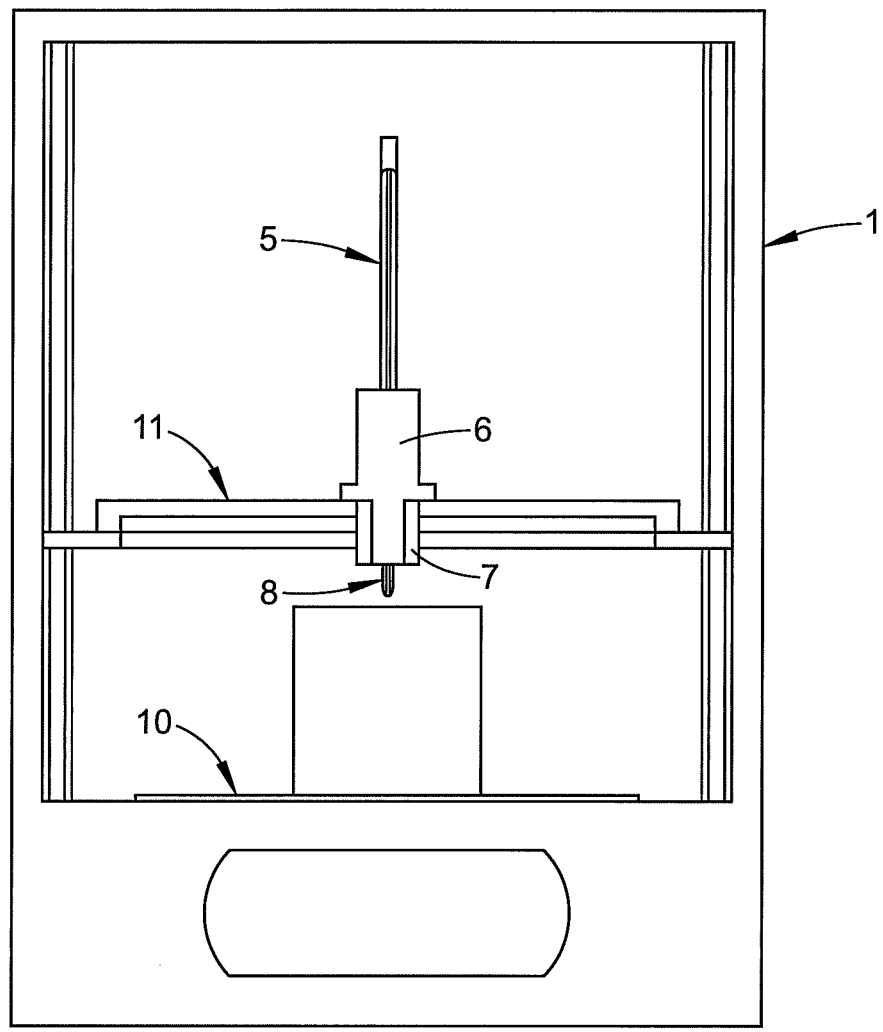
FIG. 3 is a front perspective view of a unit for building 3D objects with an interdependent drive system.
Figure 5:
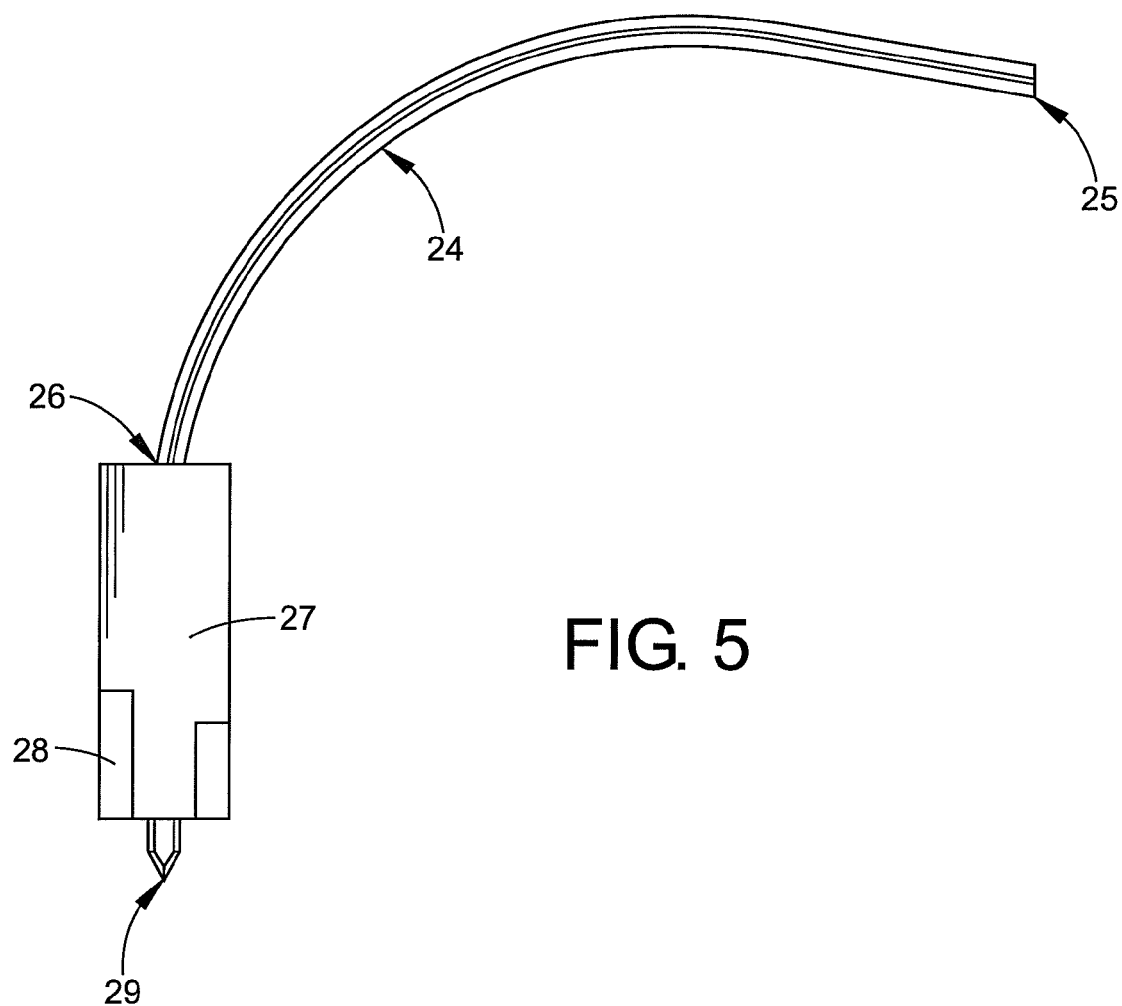
FIG. 5 is a detailed view of the dynamic driver assembly used in the interdependent drive system.

As the thermoplastic filament travels through the tubing 5 within the main body 1, it is pushed through a secondary push-to connector 26 into the dynamic filament drive assembly 27 which can also be permanently mounted to the gantry system 11 (FIG. 3). Drive rolls within dynamic filament drive assembly 27 can be powered by drive mechanism engaged with electromechanically controlled drive motor. After engaging the drive rolls (not shown) of the dynamic filament drive assembly 27, the thermoplastic filament is advanced into the filament extrusion hot end 28 which because of the rise in temperature increases the viscosity of the material allowing it to flow through the filament extrusion nozzle 29 (FIG. 5). The temperature at which the filament is heated depends entirely on the filament material's melting temperature and glass temperature range and could be provided by the manufacturer. Also, since the filament is fed to the dynamic driver 6 from the static driver 4 at the same rate that the dynamic driver 6 is pushing the filament through the extrusion nozzle, there is no jamming or slipping of the filament and it further allows for better control of the filament feed rate.

As the thermoplastic filament is extruded and the gantry system 11 moves in the x, y, and z directions the extruded thermoplastic filament is deposited in subsequent layers on the heated build platform 10 to create a 3D printed object 9 (shown in FIG. 1).

During a typical operation, a spool of single stranded thermoplastic filament is placed in the material holder and the thermoplastic filament can be manually loaded into a static filament driver. The drive rolls present within the static driver and driven by an electromechanical controller pulls the filament into the static drive assembly through a filament entry gate and pushes the filament past a filament exit gate into the flexible tubing. The filament which is then pulled through the flexible tubing, by the force exerted by the drive rolls in the dynamic driver, enters the main body through an inlet. It subsequently travels along the tubing within the main body and enters the dynamic filament driver. The driver rolls within the dynamic driver further aids in pushing the filament through a secondary push connector and feeds the filament into a heating component. Due to a rise in temperature in the filament hot end the filament turns viscous and flows through a nozzle. Further movement of the heated build platform in x, y and z- directions helps the flowing material to deposit in layers to create a final three-dimensioned object. The interdependent dual drive system of the present disclosure can be used for any thermoplastic filament known to be suitable for additive manufacturing. Suitable filament can have a thickness varying in the range of about 1.75 mm to about 3 mm. Since the two drivers operate in unison because of how they are connected to the controller the system prevents any slippage of the material.

Figure 6:
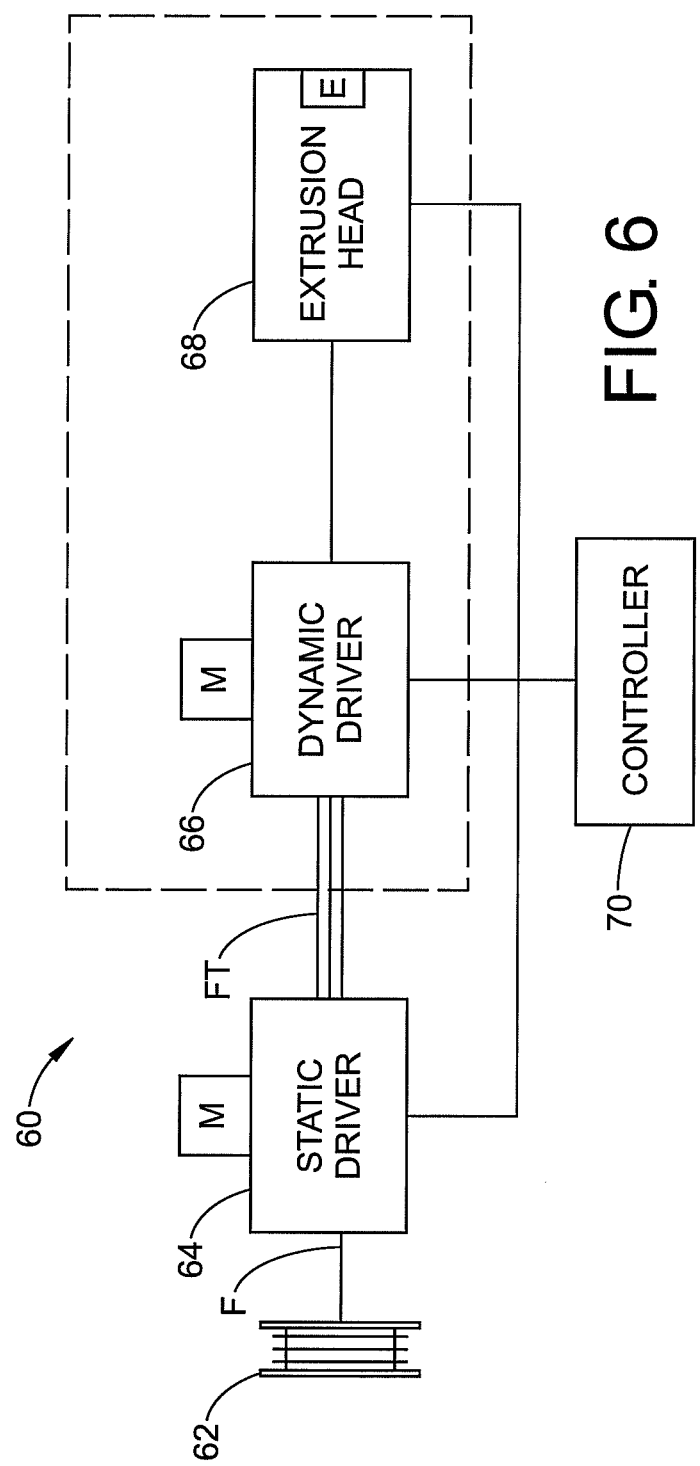
FIG. 6 is a schematic diagram of an exemplary system in accordance with the present disclosure.

Turning to FIG. 6, an exemplary system 60 is illustrated generally including a spool of filament 62, a static driver 64, a dynamic driver 66, an extrusion head 68 including an extruder E, and a controller 70 operably connected to at least one of the static driver 64, dynamic driver 66, and/or extruder head 68 for controlling operational aspects of the same. It will be appreciated that one or both of the static driver 64 or dynamic driver 66 can include an electric motor M for driving one or more wheels or other drive elements to advance and/or retract a filament F. Dynamic driver 66 and extrusion head 68 are movable mounted on a gantry 68 in a conventional manner. It will be appreciated that dynamic driver 66 moves relative to static driver 64 during operation of the system 60. Flexible tube FT extends between the static driver 64 and the dynamic driver 66. The flexible tube FT guides and/or supports the filament F during relative movement of the drivers, for example.

It should be appreciated that the advancement rates of the static driver 64 and dynamic driver 66 can be the same. That is, each driver can be operated to advance filament F at a common rate. In other embodiments, it can be desirable to provide different advancement rates for each driver. This may be desirable in certain applications based on printing speed and/or filament characteristics. In some embodiments, one driver may serve as the primary driver for advancing the filament while the other driver is selectively activated to provide secondary advancement under certain predetermined conditions, or when certain operational characteristics are detected (e.g., slippage of the filament, driver motor current draw, etc.). By providing both the static and dynamic drivers, the present disclosure can facilitate feeding of a wider variety of filament materials and/or dimensions than convention drivers.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. An interdependent dual drive extrusion system comprising:
   a static filament driver having a proximal end for receiving an associated thermoplastic filament and a distal end from which the associated thermoplastic filament is advanced, wherein the proximal end includes a first filament gate and the distal end includes a second filament gate;
   a dynamic filament driver having a proximal end for receiving the associated thermoplastic filament advanced from the static filament driver and a distal end from which the thermoplastic filament is advanced; and
   an extruder;
   wherein the proximal end of the dynamic filament driver is connected to the distal end of the static driver through a flexible tubing having a passageway for transmitting the associated thermoplastic filament, and the distal end of the dynamic filament driver is attachable to a filament extrusion head including the extruder; and
   wherein the static filament driver and dynamic filament driver cooperate to advance the associated thermoplastic filament at a steady rate regardless of movement or position of the dynamic filament driver relative to the static filament driver; and the static filament driver and the dynamic filament driver are connected to a controller which operates them in unison to prevent any slippage of the thermoplastic filament; and
   wherein the interdependent dual drive extrusion system further comprises a gantry system, a heated build platform and a heated filament extrusion end; and the gantry system serves to transport the dynamic filament drive assembly, the filament extrusion hot end and a filament extrusion nozzle in the x, y, and z directions.

2. The drive system of claim 1 wherein a first filament gate at the proximal end of the static filament driver is a filament entry gate and a second filament gate disposed at the distal end of the static driver is a filament exit gate, wherein the filament entrance and exit gates are adapted to guide the associated filament into and out of the static filament driver.

3. The drive system of claim 1 wherein the static filament driver further comprises a drive roll driven by an electric motor.

4. The drive system of claim 1 wherein the static driver is connected to a flexible tubing through a detachable primary push connector.

5. The drive system of claim 1 further comprising a filament material holder, the filament material holder adapted to support a spool of thermoplastic filament.

6. The drive system of claim 4 wherein the thermoplastic filament material is selected from the group comprising acrylonitrile butadiene styrene (ABS), polylactic acid (PLA), high impact polystyrene (HIPS), or poly vinyl alcohol.

7. The drive system of claim 1 wherein the proximal end of the dynamic driver includes a detachable secondary push connector that connects the dynamic driver to a flexible tubing.

8. The drive system of claim 1 wherein the flexible tubing is made of polytetrafluoroethylene (PTFE).

9. A method for advancing a thermoplastic filament to be used in additive manufacturing application comprising:
   providing a thermoplastic filament; and advancing the thermoplastic filament with an interdependent dual drive extrusion system according to claim 1 having a static filament driver with a proximal end and a distal end, wherein a filament entry gate is disposed at the proximal end and a filament exit gate is disposed at the distal end, a dynamic and synergic filament driver having a proximal end and a distal end, wherein the proximal end is connected to the static drive system through a flexible element and the distal end is attachable to a filament extrusion nozzle.

10. The method of claim 9 wherein the thickness of the thermoplastic filament ranges from about 1.75 mm to about 3 mm.

* * * * *